US011898821B2

(12) United States Patent
Crepy

(10) Patent No.: US 11,898,821 B2
(45) Date of Patent: Feb. 13, 2024

(54) PASSIVE SHOCK-ABSORBING SYSTEM FOR A SIGHTING APPARATUS

(71) Applicant: IXBLUE, Saint-Germain-en-Laye (FR)

(72) Inventor: Bruno Crepy, Saint-Germain-en-Laye (FR)

(73) Assignee: EXAIL, Saint-Germain-en-Laye (FR)

( * ) Notice: Subject to any disclaimer, the term of this patent is extended or adjusted under 35 U.S.C. 154(b) by 323 days.

(21) Appl. No.: 17/438,780

(22) PCT Filed: Mar. 11, 2020

(86) PCT No.: PCT/FR2020/050499
§ 371 (c)(1),
(2) Date: Sep. 13, 2021

(87) PCT Pub. No.: WO2020/183106
PCT Pub. Date: Sep. 17, 2020

(65) Prior Publication Data
US 2022/0155044 A1    May 19, 2022

(30) Foreign Application Priority Data
Mar. 14, 2019   (FR) ...................................... 1902596

(51) Int. Cl.
*F41G 11/00*   (2006.01)
*F16F 15/02*   (2006.01)
*F16F 15/08*   (2006.01)

(52) U.S. Cl.
CPC .......... *F41G 11/002* (2013.01); *F16F 15/021* (2013.01); *F16F 15/085* (2013.01); *F16F 2224/025* (2013.01)

(58) Field of Classification Search
CPC ..... F41G 11/002; F16F 15/021; F16F 15/085; F16F 2224/025; F16F 15/04
(Continued)

(56) References Cited

U.S. PATENT DOCUMENTS 2,739,384 A * 3/1956 Chokae ................. F41G 11/002
42/126
2,854,748 A * 10/1958 Williams .............. F41G 11/002
42/126
(Continued)

FOREIGN PATENT DOCUMENTS

DE         27 03 990      8/1978
EP          2 891 009     9/2016
WO       2017/109720    6/2017

OTHER PUBLICATIONS

"Theorie des mecanismes", Wikipedia, Jul. 25, 2018, 25 pages, https://ft.wikipedia.org/w/index.php?title=Theorie_des_mecanismes&oldid=I50701803.
(Continued)

*Primary Examiner* — Michael D David
(74) *Attorney, Agent, or Firm* — NIXON & VANDERHYE

(57) ABSTRACT

Disclosed is a passive shock-absorbing system for a sighting apparatus installed on a device including equipment generating the shocks, the system including two rigid plates substantially parallel to one another, via a first plate secured to the part of the device including the equipment and a second plate secured to the sighting apparatus, the plates being connected to one another by a position return component returning the plates to a determined relative rest position after absorbing a shock. The system is characterized in that the position return component includes a line-point-plane positioning unit with balls between the two plates and a set of elastic return members connecting the two plates to one another. A corresponding device is also disclosed.

20 Claims, 2 Drawing Sheets

(58) Field of Classification Search
USPC ............ 267/136, 140.11; 248/638, 562, 636;
42/124, 127, 126; 188/268
See application file for complete search history.

(56) References Cited

U.S. PATENT DOCUMENTS

| | | | | |
|---|---|---|---|---|
| 4,026,054 | A * | 5/1977 | Snyder | F41G 11/002 362/110 |
| 5,155,915 | A * | 10/1992 | Repa | F41G 11/003 42/129 |
| 6,708,439 | B1 * | 3/2004 | Laitala | F41G 11/002 42/126 |
| 9,267,753 | B2 * | 2/2016 | Dextraze | F41G 11/002 |
| 11,002,517 | B1 * | 5/2021 | Holly | F41G 1/30 |
| 2014/0059908 | A1 * | 3/2014 | Dextraze | F41G 11/002 42/1.06 |
| 2015/0316113 | A1 * | 11/2015 | Ball | F16F 1/14 267/136 |
| 2016/0031686 | A1 * | 2/2016 | Kuttel | F16F 15/04 310/90 |
| 2021/0318099 | A1 * | 10/2021 | Holly | F41G 11/002 |
| 2022/0042769 | A1 * | 2/2022 | Crepy | G01S 7/003 |
| 2022/0244047 | A1 * | 8/2022 | Vallee | G01C 15/002 |

OTHER PUBLICATIONS

International Search Report for PCT/FR2020/050499 dated Sep. 15, 2020, 7 pages.
Written Opinion of the ISA for PCT/FR2020/050499 dated Sep. 15, 2020, 5 pages.

* cited by examiner

PASSIVE SHOCK-ABSORBING SYSTEM FOR A SIGHTING APPARATUS

This application is the U.S. national phase of International Application No. PCT/FR2020/050499 filed Mar. 11, 2020 which designated the U.S. and claims priority to FR Patent Application No. 1902596 filed Mar. 14, 2019, the entire contents of each of which are hereby incorporated by reference.

TECHNICAL FIELD

The present invention generally relates to field of mechanics and shock absorbing. It more particularly applies to sighting apparatuses mounted in the vicinity of equipment generating very high levels of shocks, said equipment being preferentially weapon systems. The invention is especially useful in the field of optical sighting for which the accuracy requirements are the highest.

TECHNOLOGICAL BACK-GROUND

In the case of a weapon system generating significant shocks at each shot, in particular in the case of a gun, it is necessary, just after the shot, to have a sighting means harmonized with said gun to acquire the target again and that, even in case of burst mode shooting.

For that purpose, two strategies can be used.

The first strategy consists in "hardening" the sighting device for the latter to be robust and as stiff as possible. Doing so, the viewfinder becomes heavier.

The second strategy consists in using a passive filtering device of the "silent block" type for absorbing the generated shock energy. The difficulty of this type of passive filtering device lies in the fact that it must achieve the following compromise: on the one hand, the device must have a sufficient level of absorption of the shocks that are to be filtered, this absorption being generally accompanied by a deformation of the filtering device, and on the other hand, the same level of referencing accuracy before and after the shocks.

It is known from EP 2 891 009 a camera-based vision system provided with a stress-reduction system making it possible to bring a camera back to a determined position.

DISCLOSURE OF THE INVENTION

More particularly, it proposed according to the invention a passive shock-absorbing system of the line-point-plane type for filtering shocks produced by equipment of the weapon system type for a sighting apparatus of said equipment.

The principle of the invention is to combine the following two material means:
- a "line-point-plane" assembly that allows an accurate repositioning between the viewfinder and a support comprising the equipment, whether the viewfinder is motorized or not, and
- shock-absorbers that are typically spring-based and that allow connecting the support to the viewfinder and to "bring back" the viewfinder to its initial rest position after the shock.

The invention more specifically relates to a passive shock-absorbing system for a sighting apparatus installed on a device comprising equipment generating said shock, the system comprising two rigid plates substantially parallel to each other, including a first plate secured to the part of the device that comprises the equipment and a second plate secured to the sighting apparatus, the plates being connected to each other by a position return means for returning the plates to a determined relative rest position after absorbing a shock.

According to the invention, the position return means comprises a line-point-plane positioning means with balls between the two plates and a set of elastic return members connecting the two plates to each other. These elastic return members are arranged perpendicular to the planes of the two plates and/or parallel to these latter and/or inclined with respect to these latter.

Other non-limitative and advantageous features of the system according to the invention, taken individually or according to all the technically possible combinations, are the following:
- each plate is flat and forms a plane corresponding to the designation "plane of the plate" or "plane of the (two) plates" or "plane of the second of the two plates" and equivalent,
- the shocks are impulsive shocks,
- the shock-generating equipment is a weapon system,
- the equipment is a gun,
- the equipment is a mortar,
- the equipment is machine gun,
- the line-point-plane positioning means comprise three balls placed between the two plates and secured to a first of the two plates, a first ball being able to move on a moving plane of the second of the two plates, a second ball being able to move in a hollow cone or trihedron of the second of the two plates and a third ball being able to move in a hollow V or V-shaped groove of the second of the two plates,
- the moving plane is a plane on which one of the balls can move,
- the moving plane of the second of the two plates is a hollow area of the second plate, the edges of the hollow area forming moving stops for the moving of the first ball,
- the hollow area forming the plane of the second of the two plates is full field with the internal face of the second of the two plates,
- the hollow cone or trihedron of the second of the two plates is full field with the internal face of the second of the two plates,
- the hollow V or V-shaped groove of the second of the two plates is full field with the internal face of the second of the two plates,
- preferably, the hollow V or V-shaped groove of the second of the two plates open to the edge of the second of the two plates,
- the balls are fixed and immobilized to the first plate,
- the balls are fixed and immobilized to the first plate by gluing, welding or another equivalent method,
- the balls fixed and immobilized to the first plate are half-sphere protrusions of the internal face of the first of the two plates,
- the half-sphere protrusions of the internal face of the first plate are obtained by machining or another equivalent method,
- the balls fixed and immobilized to the first plate are spheres fastened in hemispheric cavities of the internal face of the first plate,
- the elastic return members are chosen among metal springs and elastomeric material blocks or combinations of metal springs and elastomeric material blocks, the elastomeric material blocks are "silent blocks",
the metal springs are spiral wound, also called helical or coil springs, and at rest, in the absence of shock, the spring turns are not joined,
the longitudinal elastic members comprise metal springs and elastomeric material blocks,
at least part of the set of elastic return members is consisted of transverse elastic members arranged perpendicular to the planes of the plates, between the two plates, each transverse elastic member having two ends, a first of the two ends being fastened to a first of the two plates and the second of the two ends being fastened to the second of the two plates,
the transverse elastic members of the metal spring type are spiral wound, and at rest, in the absence of shock, the turns of some of the transverse springs are not joined and produce a tensile force tending to move the plates closer to each other, and the turns of other transverse springs are not joined and produce a compressive force tending to move the plates apart from each other, the tensile and compressive forces of the transverse elastic members in the system compensating each other in said rest condition,
each plate comprises at least one bearing surface perpendicular to the plane of the plate, and at least part of the set of elastic return members is consisted of longitudinal elastic members, each longitudinal elastic member being arranged parallel to the planes of the plates, between two bearing surfaces of the two plates, each longitudinal elastic member having two ends, a first of the two ends being fastened to a bearing surface of a first of the two plates and the second of the two ends being fastened to a bearing surface of the second of the two plates,
each plate comprises at least one pair of bearing surfaces perpendicular to the plane of the plate and at + and −45° with respect to the determined predominant direction or mean direction according to the case, and at least part of the set of the elastic return members is consisted of two longitudinal elastic members arranged in V and at + or −45° with respect to the determined predominant direction or mean direction according to the case, each elastic member arranged in V being positioned in a plane parallel to the determined predominant direction or mean direction according to the case and between the bearing surfaces of the two plates,
the elastic members are configured in such a way as to oppose a rotation of the first plate with respect to the second plate,
the longitudinal elastic members are more particularly configured in such a way as to oppose a rotation of the first plate with respect to the second plate,
at least two longitudinal elastic members are arranged perpendicular to each other,
the longitudinal elastic members are configured by pair(s), the two longitudinal elastic members of the pair being perpendicular to each other,
the longitudinal and transverse elastic members of the metal spring type are spiral wound, and at rest, in the absence of shock, the turns of the longitudinal springs are not joined and produce a zero tensile and compressive force on the bearing surfaces,
the longitudinal elastic members of the metal spring type are spiral wound, and at rest, in the absence of shock, the turns of some of the longitudinal springs are not joined and produce a tensile force tending to move the bearing surfaces closer to each other, and the turns of other longitudinal springs are not joined and produce a compressive force tending to move the bearing surfaces apart from each other, the tensile and compressive forces of the longitudinal elastic members in the system compensating each other in said rest condition,
the two plates have peripheral edges,
the peripheral edges of the two plates are substantially parallel to each other,
at least part of the transverse elastic members is positioned towards the peripheral edges of the two plates,
at least part of the longitudinal elastic members is positioned towards the peripheral edges of the two plates,
the line-point-plane positioning means and the set of elastic return members comprise materials and/or are structured in such a way as to reduce the effects of expansion due to temperature variations,
the three balls are made with a same material,
the system is waterproof and dustproof.

The invention also relates a device comprising equipment generating shocks and a sighting apparatus, said device comprising a passive shock-absorbing system, for the sighting apparatus, and that is such as described.

Other non-limitative and advantageous features of the device according to the invention, taken individually or according to all the technically possible combinations, are the following:
the sighting apparatus comprises a base and the base of the sighting apparatus is fastened to one of the two plates, the other plate being fastened to the part of the device that comprises the equipment generating the shocks,
the equipment generating the shocks produces, during the shocks, movements of the device that have a determined predominant direction, and the plates are positioned substantially parallel to said determined predominant direction,
the determined predominant direction is constant with respect to the base of the sighting apparatus,
the sighting apparatus comprises a sighting head rotatable with respect to its base,
the equipment generating the shocks is adjustable and produces, during the shocks, movements of the device that have variable determined predominant directions according to the equipment adjustment, and the plates are positioned in such a way as to follow the equipment adjustment and so that the plates remain substantially parallel to each determined predominant direction,
the equipment generating the shocks is adjustable and produces, during the shocks, movements of the device that have variable determined predominant directions according to the equipment adjustment, said variable determined predominant directions making it possible to define a mean direction and the plates being positioned substantially parallel to the mean direction,
the mean direction is chosen in the direction of the most significant shocks,
the determined predominant direction is variable with respect to the base of the sighting apparatus,
the main direction of the hollow V or V-shaped groove is parallel to the determined predominant direction or mean direction according to the case,
the system comprises longitudinal elastic members and at least one of the longitudinal elastic members is parallel to the determined predominant direction or mean direction according to the case,
the shocks are repetitive, and the system is configured in such a way that the return time in a determined area of extension about the relative rest position is lower than the minimum time separating two successive shocks, the determined area of extension is a sphere of radius lower than or equal to 10 µm about the relative rest position.

The proposed system allows an accurate position and direction referencing, typically better than a few hundreds of µm in position and a few hundreds of µrad in direction, in order to harmonize the line of sight of a viewfinder with respect to a device comprising a shock generator and supporting the viewfinder. This system makes it possible to maintain the referencing during vibration cycles corresponding to one or several shots of the weapon system. Thanks to the invention, the sighting apparatus can be mounted on the weapon system and/or on a motor vehicle.

DETAILED DESCRIPTION OF AN EXEMPLARY EMBODIMENT

The following description in relation with the appended drawings, given by way of non-limitative examples, will allow a good understanding of what the invention consists of and of how it can be implemented.

Figure 1:
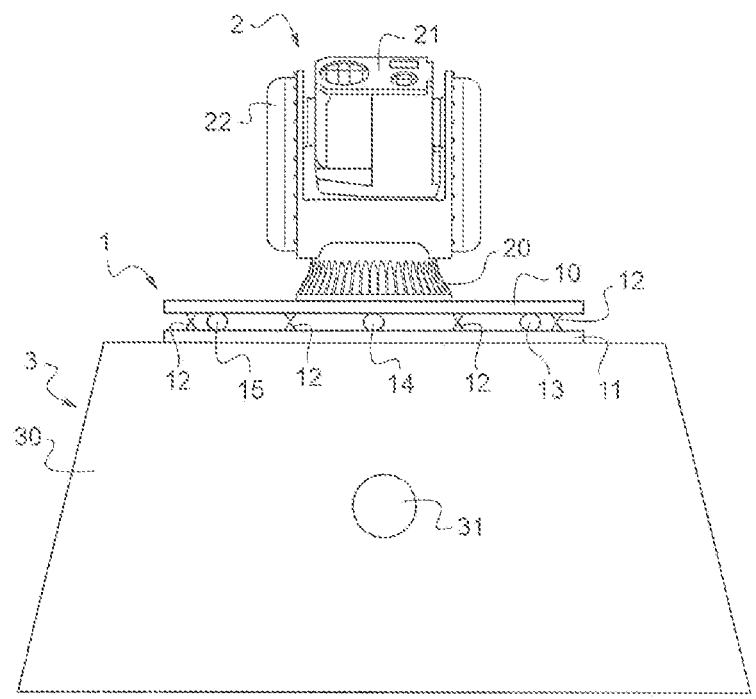
FIG. 1 shows a schematic front view of a weapon system with a viewfinder installed through the passive shock-absorbing system of the invention, FIG. 2 schematically shows the principle of arrangement of the transverse elastic members extended between the two plates, perpendicular to the planes of the two plates, FIG. 3 schematically shows the principle of arrangement of the longitudinal elastic members, each longitudinal elastic member being arranged parallel to the planes of the two plates, between two bearing surfaces of the two plates, and FIG. 4 schematically shows the principle of arrangement of the diagonal elastic members extended between the two plates, FIG. 5 schematically shows an exploded and perspective view of the two plates with ball line-point-plane positioning means, the elastic return members having been omitted to simplify the figure.
Figure 5:
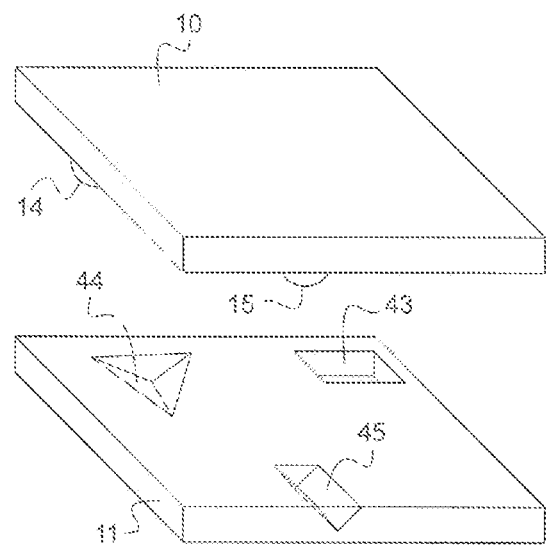
Figure 6:
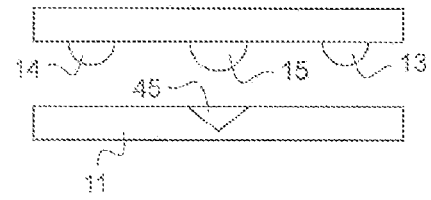
FIG. 6 shows a front view of the two plates of FIG. 5, parallel to the planes of the two plates.

In FIG. 1 is shown a device 3 comprising a motorized sighting apparatus 2 that is arranged on a support 30 for a gun 31. The sighting apparatus 2 is installed on this support 30 through a passive shock-absorbing system 1 that comprises:

two machined rigid plates 10, 11 comprising, between each other:

transverse 12 and longitudinal 16 springs (these latte being not shown in FIG. 1) connecting the two plates 10, 11 to each other and making it possible to bring back the plates, following a shock, in a defined position with respect to each other, and three balls 13, 14, 15 secured to a first 10 of the two plates 10, 11 and placed between the two plates. The first ball 13 can move on a moving plane 43 of the second plate 11, the second ball 14 being received in a hollow cone or trihedron 44 of the second plate 11 and the third ball 15 being received in a hollow V or a V-shaped groove 45, also called "V-groove" of the second plate 11. The cone 44 or the "V-groove" 45 can be added on the second plate 11 or made into the second plate 11. Preferably, the moving plane 43 is recessed and its edges form a stop to the excursion of the first ball 13. The structure of the two plates 10, 11 and the "line-point-plane" assembly can be seen more precisely in FIGS. 5 and 6.

The sighting apparatus 2 comprises a base 20 fastened to one of the plates, the plate 10 in FIG. 1, the other plate 11 being fastened to the support 30. The sighting apparatus 2 comprises a sighting head 21 that is mounted, motorized, on two arms 22.

In this example of FIG. 1, the gun 31 and the support 30 remain in a constant orientation relationship and the shocks have hence always the same determined predominant direction for the support and also for the base 20 of the sighting apparatus 2. This determined predominant direction in the axis of the gun hence points towards the observer of FIG. 1 and the two plates 10 and 11 are parallel to this determined predominant direction.

In other embodiments, the gun 31 can be adjustable with respect to the support and hence with respect to the base 20 of the sighting apparatus 2 and hence the shocks can have various determined predominant directions with respect to the support 30 and to the base of the sighting apparatus 2. In such a case, it is preferable to determine a mean direction of the shocks and to place the plates parallel to this mean direction. In an alternative, means can be implemented for the plates to remain substantially parallel to the predominant directions of the shocks during the different adjustments of the gun 31.

It can however be noted that the proposed absorbing and repositioning system is efficient enough so that it can operate in other positions of the plates than parallel to the shock directions.

Given that the weapon systems generating shocks are generally also subject to vibrations, it is desirable that, during the vibrations and before and after the shocks, the device provides a very accurate repositioning. For that purpose, the springs are chosen in such a way that the return force is significantly higher than the ejection force caused by the linear accelerations induced during the vibrations. On the other hand, during a shock, the system is stressed and moved and the line-point-plane assembly used brings back the two opposite plates to the same position and the same direction as initially.

Figure 2:
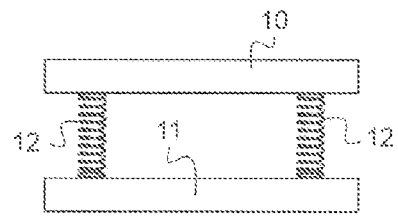
Figure 3:
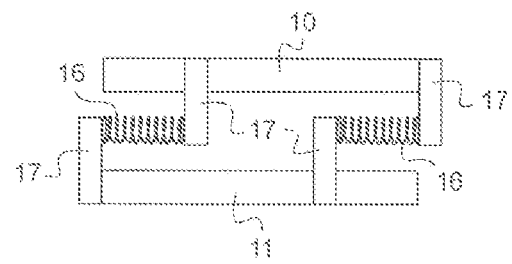

Two types of springs can be used simultaneously or separately, transverse springs as schematized in FIG. 2 and longitudinal springs as schematized in FIG. 3. Given that the longitudinal springs are parallel to the planes of the two plates, bearing surfaces 17, perpendicular to the planes of the two plates, are made in such a way as to receive the ends of the longitudinal springs, for a given spring, one of its two bearing surfaces is on a first of the two plates and the second bearing surface of both is on the second of the two plates. Preferably, the longitudinal springs are parallel to the determined predominant or mean direction. In the case where the direction of the shocks can vary, a V-shaped arrangement of spring pairs can be provided, at +/−45° with respect to the mean direction of the shocks. The springs, in particular the longitudinal ones, are also useful to limit the rotation of the plates between each other.

Figure 4:
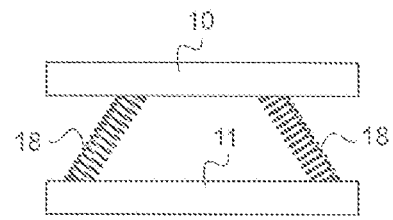

In other implementation modes, the springs can be arranged in diagonal with respect to the two planes of the two plates, as shown in FIG. 4.

Each of the two ends of each spring can be secured to the corresponding plate or not secured thereto but, in any case, it is made sure that the shocks do not cause the ejection or the untimely move of the springs.

Due to the structure of the line-point-plane positioning means and the existence of a certain level of friction between the elements of the system, the shock energy quickly dissipates and the system allows rapidly bringing back the two opposite plates to the same position and the same direction as initially.

It is understood that the invention can be implemented in other ways, for example with elastomeric elements instead of springs, with other spring directions with respect to the plates, in particular by associating springs that are perpendicular and/or parallel and/or inclined with respect to the planes of the two plates and/or with respect to the direction of the shocks.

The invention claimed is:

1. A passive shock-absorbing system for a sighting apparatus installed on a device comprising equipment generating said shocks, the system comprising two rigid plates substantially parallel to each other, including a first plate secured to the part of the device that comprises the equipment and a second plate secured to the sighting apparatus, the plates being connected to each other by a position return means for returning the plates to a determined relative rest position after absorbing a shock, wherein the position return means comprises a line-point-plane positioning means with balls between the two plates and a set of elastic return members connecting the two plates to each other.

2. The system according to claim 1, wherein the line-point-plane positioning means comprises three balls placed between the two plates and secured to a first of the two plates, a first ball being able to move on a moving plane of the second of the two plates, a second ball being able to move in a hollow cone or trihedron of the second of the two plates and a third ball being able to move in a hollow V or V-shaped groove of the second of the two plates.

3. The system according to claim 1, wherein the elastic return members are chosen among metal springs and elastomeric material blocks or combinations of metal springs and elastomeric material blocks.

4. The system according to claim 1, wherein at least part of the set of elastic return members is consisted of transverse elastic members arranged perpendicular to the planes of the plates, between the two plates, each transverse elastic member having two ends, a first of the two ends being fastened to a first of the two plates and the second of the two ends being fastened to the second of the two plates.

5. The system according to claim 1, wherein each plate comprises at least one bearing surface perpendicular to the plane of the plate, and wherein at least part of the set of elastic return members is consisted of longitudinal elastic members, each longitudinal elastic member being arranged parallel to the planes of the plates, between two bearing surfaces of the two plates, each longitudinal elastic member having two ends, a first of the two ends being fastened to a bearing surface of a first of the two plates and the second of the two ends being fastened to a bearing surface of the second of the two plates.

6. The system according to claim 5, wherein at least two longitudinal elastic members are arranged perpendicular to each other.

7. A device comprising equipment generating shocks and a sighting apparatus, said device comprising a passive shock-absorbing system, for the sighting apparatus, that is according to claim 1.

8. The device according to claim 7, wherein the equipment generating the shocks produces, during the shocks, movements of the device that have a determined predominant direction, and wherein the plates are positioned substantially parallel to said determined predominant direction.

9. The device according to claim 7, wherein the equipment generating the shocks is adjustable and produces, during the shocks, movements of the device that have variable determined predominant directions according to the equipment adjustment, said variable determined predominant directions making it possible to define a mean direction and wherein the plates are positioned substantially parallel to the mean direction.

10. The device according to claim 8, wherein the main direction of the hollow V or V-shaped groove is parallel to the determined predominant direction.

11. The device according to claim 8, wherein the system comprises longitudinal elastic members and that at least one of the longitudinal elastic members is parallel to the determined predominant direction.

12. The system according to claim 2, wherein the elastic return members are chosen among metal springs and elastomeric material blocks or combinations of metal springs and elastomeric material blocks.

13. The system according to claim 2, wherein at least part of the set of elastic return members is consisted of transverse elastic members arranged perpendicular to the planes of the plates, between the two plates, each transverse elastic member having two ends, a first of the two ends being fastened to a first of the two plates and the second of the two ends being fastened to the second of the two plates.

14. The system according to claim 2, wherein each plate comprises at least one bearing surface perpendicular to the plane of the plate, and wherein at least part of the set of elastic return members is consisted of longitudinal elastic members, each longitudinal elastic member being arranged parallel to the planes of the plates, between two bearing surfaces of the two plates, each longitudinal elastic member having two ends, a first of the two ends being fastened to a bearing surface of a first of the two plates and the second of the two ends being fastened to a bearing surface of the second of the two plates.

15. The device according to claim 9, wherein the main direction of the hollow V or V-shaped groove is parallel to the mean direction.

16. The device according to claim 9, wherein the system comprises longitudinal elastic members and that at least one of the longitudinal elastic members is parallel to the mean direction.

17. The device according to claim 10, wherein the system comprises longitudinal elastic members and that at least one of the longitudinal elastic members is parallel to the determined predominant direction.

18. The device according to claim 15, wherein the system comprises longitudinal elastic members and that at least one of the longitudinal elastic members is parallel to the mean direction.

19. The system according to claim 3, wherein at least part of the set of elastic return members is consisted of transverse elastic members arranged perpendicular to the planes of the plates, between the two plates, each transverse elastic member having two ends, a first of the two ends being fastened to a first of the two plates and the second of the two ends being fastened to the second of the two plates.

20. The system according to claim 3, wherein each plate comprises at least one bearing surface perpendicular to the plane of the plate, and wherein at least part of the set of elastic return members is consisted of longitudinal elastic members, each longitudinal elastic member being arranged parallel to the planes of the plates, between two bearing surfaces of the two plates, each longitudinal elastic member having two ends, a first of the two ends being fastened to a bearing surface of a first of the two plates and the second of the two ends being fastened to a bearing surface of the second of the two plates.

* * * * *